J. CARR.
TOOL CHUCK.
APPLICATION FILED JULY 29, 1920.
1,393,260.
Patented Oct. 11, 1921.
2 SHEETS—SHEET 2.
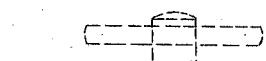
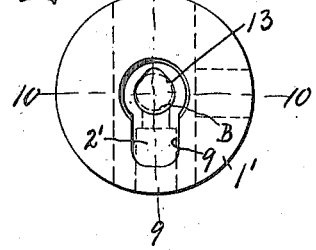
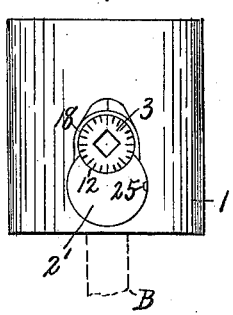
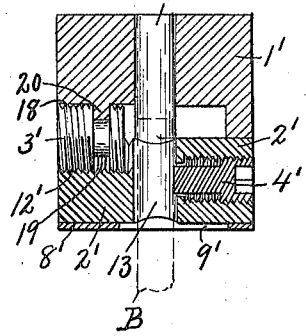
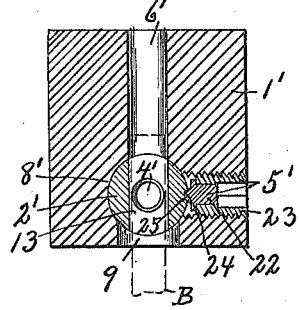
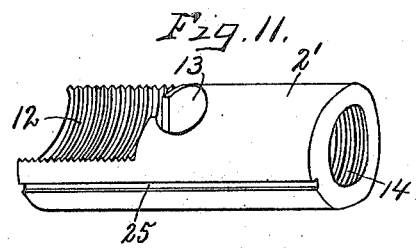
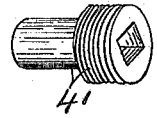
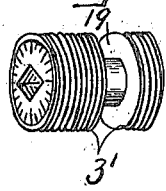
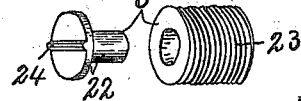
INVENTOR
James Carr
BY
Howard P. Denison
ATTORNEY.

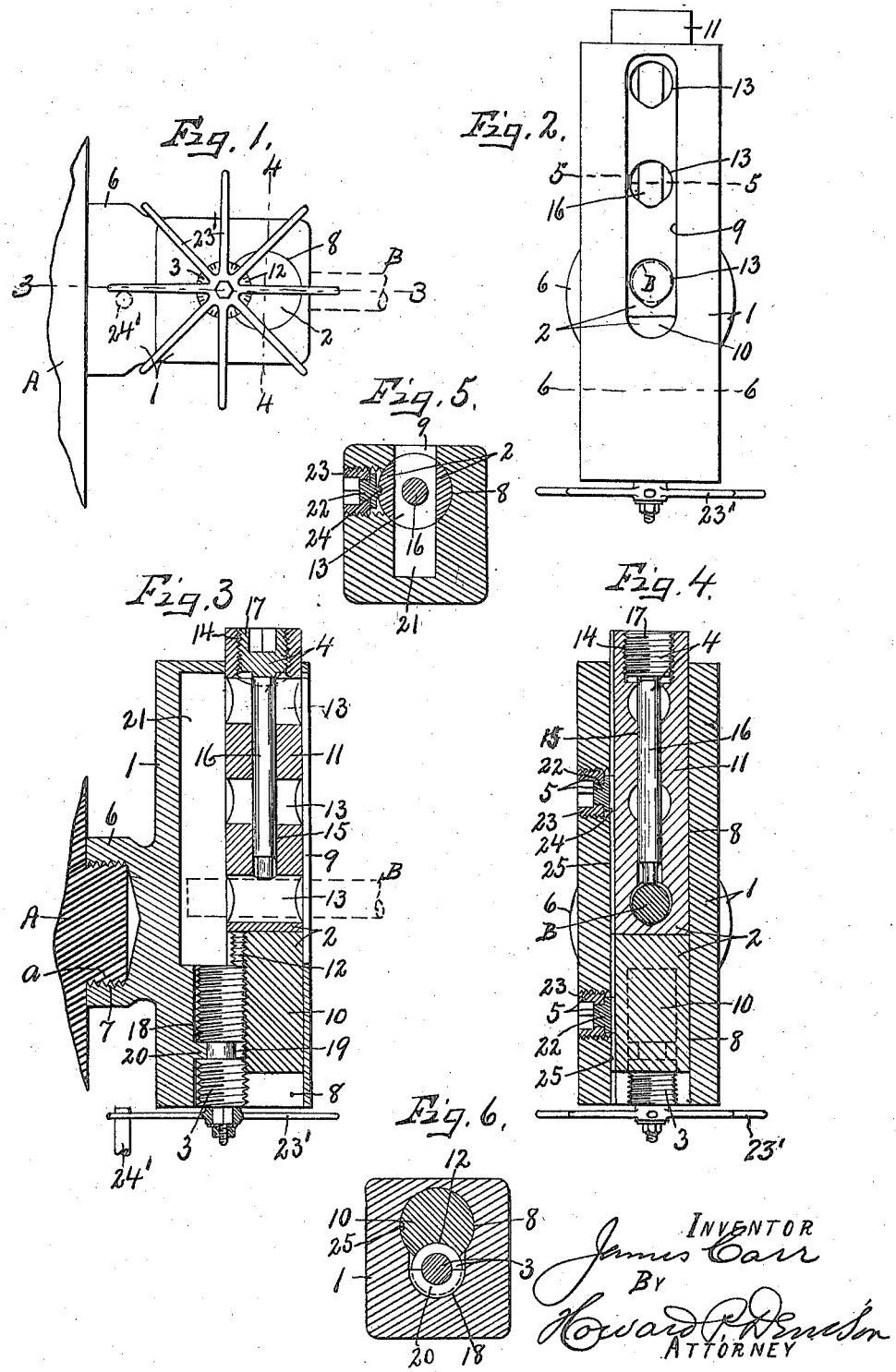

UNITED STATES PATENT OFFICE.

JAMES CARR, OF SYRACUSE, NEW YORK.

TOOL-CHUCK.

1,393,260.　　　　　　Specification of Letters Patent.　　Patented Oct. 11, 1921.

Application filed July 29, 1920.　Serial No. 399,691.

*To all whom it may concern:*

Be it known that I, JAMES CARR, of Syracuse, in the county of Onondaga, in the State of New York, have invented new and useful Improvements in Tool-Chucks, of which the following, taken in connection with the accompanying drawings, is a full, clear, and exact description.

This invention relates to centering and de-centering tool chucks for milling and boring machines, drill presses, lathes and other apparatus in which the cutting tool and work are relatively rotated to effect a cutting operation at the center or at one side of the center of the work, the broad object being somewhat similar to that set forth in my Patents No. 1,125,649, and No. 1,125,650, both issued Jan. 19, 1915, except that in the present application I have sought to increase the efficiency and de-centering range of adjustment of the tool relatively to the axis of rotation, and, at the same time, to reduce the number of parts of the chuck, and to thereby increase its strength, to reduce the cost of manufacture and to make it more serviceable for light or heavy work.

Another object is to simplify the adjustment or de-centering of the tool and to provide means whereby it may be automatically adjusted step by step radially of the axis of revolution.

Other objects and uses relating to specific parts of the chuck will be brought out in the following description.

In the drawings:

Figure 1 is a front elevation of a chuck embodying the various features of my invention, shown as operatively mounted upon a revoluble part of a machine to which it is applied, and also showing by dotted lines a portion of a cutting tool.

Fig. 2 is an end face view of the chuck shown in Fig. 1.

Figs. 3, 4, 5 and 6, are sectional views taken, respectively, on lines 3—3, and 4—4, Fig. 1, and 5—5, and 6—6, Fig. 2.

Fig. 7 is an end view of a modified form of chuck showing the wrench by dotted lines for effecting one of the adjustments.

Fig. 8 is a side elevation of the chuck shown in Fig. 7.

Figs. 9 and 10 are longitudinal sectional views taken, respectively on lines 9—9 and 10—10, Fig. 7.

Figs. 11 and 12 are perspective views of the detached tool supporting jaw and clamping screw for the tool, respectively.

Fig. 13 is a perspective view of a detached adjusting screw for the tool supporting jaw.

Figs. 14 and 15 are perspective views of the two parts of the jaw clamping means.

The chuck shown in Figs. 1 to 6, inclusive, may be mounted upon a revoluble support —A— and comprises a radially elongated head —1—, a sectional tool adjusting member —2—, a screw —3— for adjusting the member —2—, a sectional tool clamping device —4—, and one or more additional clamping devices —5— for holding the tool adjusting member —2— in its adjusted position, all of which parts are preferably made of machine steel or equivalent metal capable of withstanding the strains to which they are subjected.

The head —1— is provided at one side with a boss —6— having a threaded socket —7— adapted to screw upon an externally threaded boss —a— of the revoluble support —A—, whereby the head may be rotated, although it is evident that the head may be held stationary and the work rotated when desired, or when operating upon special work, said head being also provided with a diametrical guide opening —8— extending radially therethrough from end to end for receiving and supporting the tool adjusting member —2— therein and for guiding said member in its radial adjustment.

This guide opening —8— is substantially cylindrical in cross-section and its outer or front end wall is provided with a radially extending lengthwise slot —9— terminating at its ends short of the ends of the head —1—, so that the walls entirely around the guide opening —8— may be integrally connected to the main body of the head thereby avoiding the necessity for an extra stiffening or strengthening plate at either end of the guide opening.

The adjustable tool receiving and supporting member —2— consists, in this instance, of separate sections —10— and —11— arranged coaxially end to end and slidable endwise within the guide opening —8— both of said sections being substantially cylindrical in cross-sections to closely fit within said opening, except that the inner side of the section —10— is provided with a concave recess —12— conforming in transverse contour to the curvature of the adjusting screw —3— and extending from end to end of said section, the walls of the recess being threaded for engagement with the adjusting screw whereby the rotation of the latter in one direction or the other will move the section —10— endwise in the guide opening —8— and will transmit endwise motion to the section —11— when moved in the proper direction.

The section —11— of the member —2— is of the same diameter as the section —10— and is provided with a series of, in this instance 3, diametrical holes —13— therethrough for receiving the shank of a cutting tool —B—, a portion of which is shown by dotted lines in Figs. 1, 2 and 3, and by full lines in Fig. 4, said tool receiving holes being arranged in radially spaced relation to the axis of revolution of the chuck or work.

The innermost tool hole —13— is movable into and out of coaxial alinement with the axis of revolution of the head or work, while the meeting ends of the tool adjusting sections —10— and —11— are arranged to register with the inner end of the adjusting screw —3— when the innermost hole —13— is coaxial with the axis of revolution of the head or work, and may be termed the zero position of adjustment of the member —2— for causing the tool to operate upon the center of the work as in boring and similar operations.

The member —2— is, however, shown as adjusted to bring the innermost openings —13— at one side of the center for decentering the tool —B— to operate upon the work at one side of the center either by axial movement or by further radial movement as produced by the operation of the adjusting screw —3—.

The inner wall of each of the openings —13— is somewhat V-shaped so that if the shank of the tool —B— is cylindrical, it will engage said wall at two points only at opposite sides of the longitudinal center of the section 11.

A set screw —14— is movable endwise in a central lengthwise opening —15— in the section —11— of the tool adjusting member —2— for engaging the outer face of the tool —B— and clamping the same in place against the inner wall of one of the openings —13—, said set screw consisting in this instance of an inner section —16— and an outer section —17—, the outer section —17— being of relatively larger diameter than the inner section and threaded externally to form a screw engaging the internally threaded outer end of the opening —15— for clamping and releasing the tool —B—. The only object in making the tool receiving member —2— in sections is for convenience in cutting the thread upon the section —10—, as, otherwise, both sections might be integrally united or made in one piece.

The object in making the set screw —4— in sections is to permit the use of the sections —16— of different lengths corresponding to the distance between the threaded section —17— and different tool receiving holes —13—, so that the tool may be clamped in either one of said holes by relatively slight endwise movement of the screw sections —17—.

The adjusting screw —3— is arranged in a lengthwise opening —18— in the head —1— mainly at one side of the guide opening —8— with which the opening —18— communicates, said adjusting screw being provided with an annular recess —19— for receiving a semi-circular rib —20— on the head —1— for holding the adjusting screw against endwise movement while permitting its free rotation in engagement with the threaded portion of the section —10— of the tool receiving member —2—.

The head —1— is also provided with an interior lengthwise slot —21— adapted to receive the inner end of the shank of the tool —B— in case it should protrude beyond the inner side of the supporting section —11—. The adjusting screw —3— is threaded throughout its length except at the recess —19— and extends inwardly from the outer end face of the adjacent portion of the head —1— a distance corresponding approximately to the length of the section —10— of the tool receiving member —2—, or a sufficient distance from the axis of revolution of the head to permit the tool —B— to be brought into alinement with said axis without interfering with the adjusting screw.

The tool adjusting member —2— may be held in its adjusted position by one or more, in this instance 2, clamping screws —5—, one for the section —10— and another for the section —11—, each screw having a swiveled section —22— journaled in a screw section, as —23— and provided with a rib, as —24—, for engagement in a lengthwise groove —25— in the adjacent side of the corresponding sections —10— and —11— for holding said sections against relative rotary movement and also for frictionally binding them against the walls of the opening —8— against endwise movement when adjusted for use.

The object in providing the several tool openings —13— in the tool supporting section —2— is to afford a relatively wide radial adjustment of the tool relatively to the axis of revolution of the head or work with a relatively small adjustment of said tool supporting member and its adjusting screw.

That is, when the tool is clamped in the innermost opening —13—, it may be decentered a distance corresponding approximately to the length of the adjusting screw —3— and section —10— engaged therewith.

leaving an engagement of just a sufficient number of threads between those parts to assure proper engagement between their threads. Then, if it is desired to de-center the tool to a further extent, it may be released by the loosening of the set screw —4— and withdrawn, whereupon, the adjusting screw —3— may be operated to return the section —10— to its starting position, thus permitting a corresponding return of the section —11—, at which time, the tool may be re-inserted in the second opening —13— and the screw —3— again adjusted to begin the cutting operation where it was left off at the end of the previous adjustment, under which conditions, a shorter section —16— could be used in connection with the screw section —17— to clamp the tool in the second opening —13—.

In a similar manner, when the cutting operation has been completed to the limit of its radial movement with the tool in the second opening —13—, the set screw may be loosened to release the tool, the parts —10— and —11— returned to their starting positions and the tool re-inserted in the third opening —13— with a still shorter section —16— used in connection with the section —17— to reclamp the tool in said opening, so that the outward radial adjustment of the tool may be continued to the limit of adjustment of the section —10—.

The adjusting screw —3— may be operated by hand or automatically, and, for this purpose, is provided with an operating member —23'— commonly known as a "star wheel" which may be turned by hand at intervals as may be desired to de-center the tool, or it may be operated automatically by engagement with a fixed abutment —24'— located in the path of movement of the outer ends of the arms of the star wheel, so that during each revolution of the head, one of the arms will ride against the fixed abutment —24'— and will thereby turn the screw one arm space at each of said revolutions of the head to effect a step by step adjustment of the tool from the axis of revolution of the head or work.

In Figs. 7 to 14, inclusive, is shown a slightly modified form of chuck consisting of a cylindrical head —1'—, a tool-supporting member —2'—, an adjusting screw —3'—, a set screw —4'—, and a clamping screw —5'—.

The head —1'— is provided in one end with a socket —6'— for receiving the adjacent end of a revoluble supporting spindle, not shown, but similar to that commonly used on drill presses or analogous machines for rotating the chuck or for holding the chuck and permitting the work to be rotated relatively thereto, the opposite end of the head —1'— being provided with a cylindrical opening —8'— extending diametrically therethrough from side to side for receiving and guiding the tool supporting member —2'—, the outer end of the opening —8'— being provided with a diametrically extending slot —9'— of sufficient width to permit the tool, as —B—, to move radially therein, and of sufficient length to permit the tool to be adjusted some distance off center, or to one side of the axis of the head.

The tool supporting member —2'— is provided at its inner side with a substantially semi-circular recess —12'—. The wall of the opening —18— is threaded for engagement by the adjusting screw —3'—, said member —2'— being provided with an opening —13— similar to that previously described for receiving the tool —B—.

The set screw —4'— is engaged in a threaded socket in one end of the member —2'— for clamping the tool —B— in the opening —13—, and is similar to the set screw previously described except that it is made in one piece.

The adjusting screw —3'— and the means for holding it against endwise movement and also the clamping screw —5'— are similar to the corresponding parts of the construction shown in Figs. 1 to 6, inclusive, previously described, while the tool supporting member —2'— consists of a single piece with the tool opening near the center thereof, instead of being made in sections as shown in Figs. 1 to 6, inclusive.

It is evident that the construction shown and described may be further modified without departing from the spirit of my invention, and, therefore, I do not wish to limit myself to the precise construction shown and described.

What I claim is:

1. A tool chuck comprising a head having a diametrically extending opening therethrough, a tool-supporting member slidable endwise in said opening and provided with a lengthwise groove, a ribbed member movable in an opening in the head at one side of said member and projecting into said groove to hold the tool-supporting member against turning, a set screw movable in the threaded opening in the head for tightening and releasing the ribbed member against and from the tool-supporting member for clamping said tool-supporting member, and means for adjusting the tool-supporting member endwise.

2. A tool chuck comprising a head having a diametrically extending opening therethrough, a tool-supporting member slidable endwise in said opening and provided with a lengthwise groove, a set screw adjustable in a threaded opening in the head at one side of said member and provided with a ribbed section journaled therein to allow the screw section to turn relatively to the ribbed section for tightening said ribbed section against the tool-supporting member, said ribbed section having its rib engaged in the groove of the tool-supporting member to hold the latter against turning, and a screw for adjusting the tool-supporting member endwise.

3. A tool chuck comprising a head having a transverse opening therein, a tool-supporting member slidable endwise in said opening and provided with a transverse tool-receiving opening intermediate its ends, said member having a threaded portion at one side of the said tool opening and another threaded portion at the opposite side of said tool opening, a set screw engaging one of the threaded portions to clamp the tool in its opening, an adjusting screw engaged with the other threaded portion for adjusting the tool-supporting member endwise and means for holding the adjusting screw against endwise movement.

4. A tool chuck comprising a cylindrical head having a central lengthwise opening therethrough and a radial opening extending from the periphery of one side beyond the central lengthwise opening, one end of the central lengthwise opening being elongated radially in the direction of the length of the radial opening, a tool-supporting member slidable endwise in the radial opening and provided with a tool-receiving socket movable into and out of registration with the lengthwise opening as said member is adjusted endwise, said member having threaded portions at opposite sides of the tool-receiving socket, a set screw engaging one of said threaded portions for clamping the tool in its socket, another screw engaging the other threaded portion for adjusting the tool-supporting member endwise and means for holding the adjusting screw against endwise movement relative to the head.

In witness whereof I have hereunto set my hand this 24th day of July 1920.

JAMES CARR.

Witnesses:
　H. E. CHASE,
　ROSE G. CARROLL.